(12) United States Patent
Adzic et al.

(10) Patent No.: US 6,183,894 B1
(45) Date of Patent: Feb. 6, 2001

(54) ELECTROCATALYST FOR ALCOHOL OXIDATION IN FUEL CELLS

(75) Inventors: Radoslav R. Adzic, Setauket; Nebojsa S. Marinkovic, Coram, both of NY (US)

(73) Assignee: Brookhaven Science Associates, Upton, NY (US)

( * ) Notice: Under 35 U.S.C. 154(b), the term of this patent shall be extended for 0 days.

(21) Appl. No.: 09/434,548

(22) Filed: Nov. 8, 1999

(51) Int. Cl.$^7$ .................................................. H01M 8/00
(52) U.S. Cl. ..................... 429/13; 42/40; 42/44; 42/50; 502/101; 502/305; 502/313; 502/314; 502/315; 502/321; 502/325; 502/326; 502/333; 502/334; 502/339; 205/555
(58) Field of Search .................. 429/40, 44, 13, 429/50; 502/305, 313, 314, 315, 321, 325, 326, 333, 334, 339, 101; 204/290.12; 205/555

(56) References Cited

U.S. PATENT DOCUMENTS

| | | | |
|---|---|---|---|
| 3,645,860 | 2/1972 | Fishman et al. | 204/35 R |
| 3,977,901 | 8/1976 | Buzzelli | 136/86 A |
| 4,031,292 | 6/1977 | Hervert | 429/40 |
| 4,107,025 * | 8/1978 | Loutfy et al. | 204/290.12 |
| 4,341,848 * | 7/1982 | Liu et al. | 429/44 |
| 4,407,907 * | 10/1983 | Takamura et al. | 429/42 |
| 4,426,269 | 1/1984 | Brown et al. | 204/242 |
| 5,132,193 | 7/1992 | Reddy et al. | 429/13 |
| 5,208,207 | 5/1993 | Stonehart et al. | 502/339 |
| 5,225,391 | 7/1993 | Stonehart et al. | 502/324 |
| 5,306,579 * | 4/1994 | Shepard, Jr. et al. | 429/40 |
| 5,470,673 | 11/1995 | Tseung et al. | 429/44 |
| 5,683,829 | 11/1997 | Sarangapani | 429/42 |
| 5,702,836 | 12/1997 | Ma et al. | 429/13 |
| 5,759,944 | 6/1998 | Buchanan et al. | 502/185 |
| 5,795,669 | 8/1998 | Wilkinson et al. | 429/40 |
| 5,804,325 | 9/1998 | Yapez | 429/13 |
| 5,939,220 * | 8/1999 | Gunner et al. | 429/40 |
| 6,069,107 * | 5/2000 | Kuznetsov et al. | 502/101 |

* cited by examiner

Primary Examiner—Bruce F. Bell
(74) Attorney, Agent, or Firm—Margaret C. Bogosian

(57) ABSTRACT

Binary and ternary electrocatalysts are provided for oxidizing alcohol in a fuel cell. The binary electrocatalyst includes 1) a substrate selected from the group consisting of $NiWO_4$ or $CoWO_4$ or a combination thereof, and 2) Group VIII noble metal catalyst supported on the substrate. The ternary electrocatalyst includes 1) a substrate as described above, and 2) a catalyst comprising Group VIII noble metal, and ruthenium oxide or molybdenum oxide or a combination thereof, said catalyst being supported on said substrate.

22 Claims, 1 Drawing Sheet

ELECTROCATALYST FOR ALCOHOL OXIDATION IN FUEL CELLS

This invention was made with Government support under contract number DE-AC02-98CH10886, awarded by the U.S. Department of Energy. The Government has certain rights in the invention.

BACKGROUND

The present invention relates to electrocatalyst compositions. More specifically, the invention relates to electrocatalysts which can be used on the anode of a fuel cell to oxidize alcohol.

A fuel cell is an electrochemical device with an anode and a cathode that converts chemical energy provided by a fuel and an oxidant into electricity. An electrolyte is required which is in contact with both electrodes and which may be alkaline, acidic, solid or liquid. The basic process is highly efficient and essentially pollution-free. Also, since single fuel cells can be assembled in stacks of varying sizes, systems can be designed to produce a wide range of output levels.

As an energy conversion device, the fuel cell is distinguished from a conventional battery by its fuel storage capacity. Unlike a battery which consumes internally stored fuel and needs to be either discarded or recharged after a certain time, fuel is fed to the fuel cell from an external source giving the fuel cell a practically unlimited storage capacity. Also, the fuel cell is distinguished from a battery in that its electrodes are catalytically active.

Current is generated by reaction on the fuel cell electrode surfaces, which are in contact with an electrolyte. The fuel is oxidized at the anode and gives up electrons to an external electrical load. The oxidant accepts electrons and is reduced at the cathode. Ionic current through an electrolyte completes the circuit.

In many fuel cell systems, a hydrogen fuel is produced by converting a hydrocarbon-based fuel such as methane, or an oxygenated hydrocarbon fuel such as methanol, to hydrogen in a process called reforming. This reformate fuel contains, in addition to hydrogen, high levels of carbon dioxide; usually around 25%. The reformate fuel also contains small amounts of impurities, such as carbon monoxide, typically at levels of around 1%.

Other fuel cells, called "direct" or "non-reformed" fuel cells oxidize fuel high in hydrogen content directly, without the hydrogen first being separated by a reforming process. It has been known since the 1950s that lower primary alcohols, particularly the C1–C5 alcohols, can be oxidized directly (i.e., without reformation to $H_2+CO$ or $H_2+CO_2$) at the anode of a fuel cell. Methanol and ethanol are particularly useful.

Because compactness is critical to the commercial viability of utilizing a fuel cell as an energy source in such items as electric automobiles, the ability to oxidize alcohol as a fuel directly without having to also utilize a reformer is important. Serious drawbacks have also been encountered in the storage of hydrogen for use in fuel cells. Thus, a "direct" fuel cell, such as a methanol fuel cell, is advantageous in that it is compact and no energy is used up in reformation. Further, the fuel is easily stored in liquid form, is high in hydrogen content, is highly reactive in a fuel cell, and is economically viable.

In a typical methanol fuel cell, methanol is oxidized to produce electricity, heat, water, and carbon dioxide. The goal in methanol fuel processing is complete methanol oxidation for maximum energy generation shown in the equation:

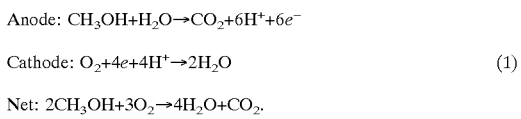

Anode: $CH_3OH+H_2O \rightarrow CO_2+6H^++6e^-$

Cathode: $O_2+4e+4H^+ \rightarrow 2H_2O$ (1)

Net: $2CH_3OH+3O_2 \rightarrow 4H_2O+CO_2$.

In the absence of an electrocatalyst, a typical electrode reaction occurs, if at all, only at very high overpotentials. Thus, the oxidation and reduction reactions require catalysts in order to proceed at useful rates. Catalysts that promote the rates of electrochemical reactions, such as oxygen reduction and hydrogen oxidation in a fuel cell are often referred to as electrocatalysts. Electrocatalysts are important because the energy efficiency of any cell is determined, in part, by the overpotentials necessary at the cell's anode and cathode.

Platinum (Pt), an expensive metal, is the best catalyst for many electrochemical reactions, including methanol oxidation. A major obstacle in the development of methanol fuel cells is the loss of electrochemical activity of even the best electrocatalyst due to "poisoning" by carbon monoxide (CO). CO is an intermediate in the oxidation of methanol to carbon dioxide ($CO_2$). The CO molecule is strongly adsorbed on the electroactive surface of the electrode, obstructing the oxidation of new fuel molecules. It is well known that CO, even at levels of 1–10 ppm, is a severe poison to platinum electrocatalysts and significantly reduces fuel cell performance.

Various attempts have been made to find a solution to the CO poisoning problem. For example, Reddy et al., U.S. Pat. No. 5,132,193 discloses the use of gold crystals for the oxidation of alcohol. Yepez, U.S. Pat. No. 5,804,325, discloses the use of deliberately occluded hydrogen in the anode to chemisorb the poisons. Various combinations of metals have also been employed as an electrocatalyst material in an attempt to avoid or minimize the CO poisoning problem. For example, Ma et al. U.S. Pat. No. 5,702,836 discloses an electrocatalyst obtained by combining platinum oxides and iron oxides to form Pt/Fe particles in a colloidal solution.

In spite of the foregoing, prior attempts to solve the problem of CO poisoning at the anode of methanol fuel cells have been unsuccessful. Prior attempts to avoid the problem have proven to be too expensive, ineffective, or impractical to be commercially viable. Thus, there remains a need for electrocatalysts that are resistant to CO poisoning and can be used on the anode for alcohol oxidation in fuel cells.

SUMMARY OF INVENTION

In accordance with the present invention, an anode is provided for use in the oxidation of alcohol in a fuel cell. The anode includes a binary electrocatalyst including 1) a substrate of $NiWO_4$ or $CoWO_4$ or a combination thereof, and 2) a Group VIII noble metal catalyst supported on the substrate. The noble metal catalyst can be selected from Group VIII noble metals, or a combination thereof. Platinum is preferred. When platinum is used, it is preferred that the electrocatalyst material have a W:Pt atomic ratio of approximately 2:1 in the surface layer. A fuel cell is also provided which utilizes the anode to oxidize alcohol.

Ternary electrocatalysts are also provided which include 1) a substrate of $NiWO_4$ or $CoWO_4$ or a combination thereof, and 2) a catalyst comprising a Group VIII noble metal, and ruthenium oxide or molybdenum oxide or a combination thereof. The catalyst is supported on the substrate. As in the binary electrocatalyst, the noble metal can be selected from the group consisting of platinum, palladium, ruthenium, iridium, rhodium, or a combination thereof. Platinum is preferred.

As with the binary electrocatalysts, the ternary electrocatalysts can be utilized in an anode for the oxidation of alcohol in a fuel cell. Lastly, a method of oxidizing alcohol is provided which includes contacting the alcohol with an anode that contains the binary or ternary electrocatalyst compositions.

By using the anodes of the invention to oxidize alcohol in a fuel cell, carbon monoxide poisoning is significantly reduced. Other advantages include lower costs due to lower weight of noble metals, higher stability with respect to agglomeration, and their increased activity at higher overpotentials.

DETAILED DESCRIPTION OF INVENTION

Figure 1:
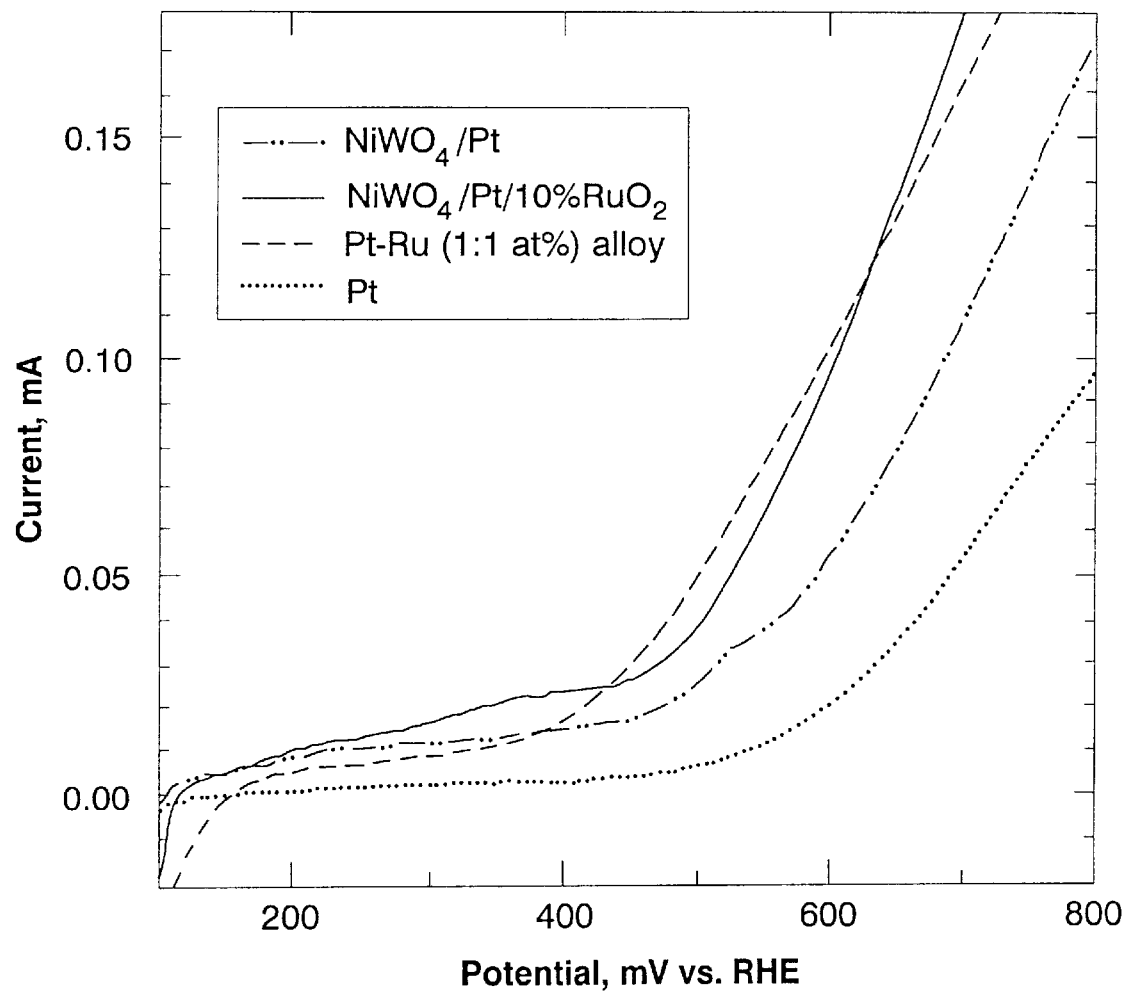
FIG. 1 is a graph demonstrating a comparison of current potential for methanol oxidation using electrocatalysts of the invention and conventional electrocatalyst materials.

Applicants have discovered that by using particular binary and ternary electrocatalyst compositions on the anode of an alcohol fuel cell, the amount of carbon monoxide poisoning at the anode can be greatly reduced, thereby increasing the ability of the anode to oxidize alcohol fuel. In general, the electrocatalysts have Group VIII noble metal catalyst supported on substrates of nickel tungstate or cobalt tungstate or a combination thereof.

Without being bound by theory, the role of the substrate is to provide an oxygen containing species necessary for the oxidation and removal of carbon monoxide, which is known to be the blocking intermediate in the course of methanol oxidation pathway. These hydroxyl species are replenished at the oxide surface due to oxide-water interaction, giving rise to a fast oxidation of CO and considerable current densities during alcohol electrooxidation.

The substrates can be prepared by any methods known in the art, ranging from the sol-gel method to solid state reactions. Sol-gel method generally produces smaller particle sizes than other methods and, therefore, higher surface area. A higher surface area substrate is preferred to facilitate the oxide-water interaction.

For example, the $NiWO_4$ and $CoWO_4$ substrates utilized in the invention can be prepared by solid-state reaction of the corresponding metal nitrates and ammonium tungstate at 600° C., which temperature is lower than that used in commercial synthesis. Applicants have found that a higher surface area of the oxide on the binary and ternary catalysts increases the oxidation activity.

The binary electrocatalyst includes 1) a substrate of $NiWO_4$ or $CoWO_4$ or a combination thereof, and 2) Group VIII noble metal catalyst supported on the substrate. The overall structure of the anode and alcohol fuel cell which utilize these electrocatalysts conform to known designs. The fuel cell has an electrolyte, an anode for the oxidation of the alcohol fuel, and a cathode for the reduction of air or oxygen to water.

The binary electrocatalyst must contain a sufficient amount of the Group VIII noble metal catalyst supported on the substrate for the oxidation of alcohol at the anode. The Group VIII noble metal catalyst supported on the substrate is selected from the group consisting of platinum, palladium, ruthenium, iridium, rhodium, or a combination thereof. Platinum is preferred. Generally, the W:Pt atomic weight ratio will vary from about 5:1 to about 1:1; with a W:Pt ratio of about 2:1 being preferred.

The present invention also includes a ternary electrocatalyst composition. The ternary electrocatalyst includes 1) a substrate of $NiWO_4$ or $CoWO_4$ or a combination thereof, and 2) a catalyst comprising a Group VIII noble metal, and ruthenium oxide or molybdenum oxide or a combination thereof. The catalyst is supported on the substrate.

In the ternary electrocatalyst, the ruthenium oxide ($RuO_x$) will usually contain two oxygen atoms and the molybdenum oxide ($MoO_x$) will usually contain three oxygen atoms. However, the stoichiometry of the oxide containing catalyst can vary during the process conditions. Such variations in the stoichiometry of the catalyst will not affect the electrochemical properties of the ternary electrocatalyst.

The Group VIII noble metal for the ternary electrocatalyst can also be selected from the group consisting of platinum, palladium, ruthenium, iridium, rhodium, or a combination thereof. Platinum is preferred. As in the binary composition, the W:Pt atomic weight ratio in the ternary composition will vary from about 5:1 to about 1:1; with a W:Pt ratio of about 2:1 being preferred. In the ternary composition, the $Pt:RuO_x$ and/or $MoO_x$ atomic weight ratio will vary from about 20:1 to about 5:1, with a ratio of about 10:1 being preferred.

As with the binary electrocatalysts, the ternary electrocatalysts can be utilized in an anode for the oxidation of alcohol in a fuel cell.

The electrocatalyst compositions of the invention can be prepared by any known method, such as chemical or electrochemical deposition of the catalytic noble metal particles on the substrate. However, it is preferred that the electrocatalysts be formed so as to maximize the surface area of the Group VIII noble metal. This will increase the contact between the alcohol and the metal and maximize the ability of the metal to catalyze the oxidation of the alcohol. Preferred methods include electrochemical deposition with low current density, or chemical deposition with a mild reducing agent such as citric acid or dilute $NaBH_4$ solution. These methods generally yield smaller particle sizes of the deposit.

For example, the binary electrocatalysts utilized in the example below were prepared by adding an appropriate amount of platinum in the form of $H_2PtCl$ to the oxide support so as to obtain an atomic ratio of $NiWO_4$:Pt of about 2:1. This was followed by the reduction of Pt with a dilute solution (0.01M) of $NaBH_4$, with strong agitation.

The ternary electrocatalyst utilized in the example were prepared by mixing 0.42 g of $H_2PtCl_6$ and 0.02 g $RuCl_3$ in 150 ml of 50% ethanol, followed by adding the solution dropwise into a cooled alkaline solution of 0.01M $NaBH_4$ in 50% alcohol with strong agitation. The ternary electrocatalysts can also be prepared through the electrochemical co-deposition of Pt and RuOx or MoOx at the support.

The structure of a typical electrode in an alcohol fuel cell includes 1) a fluid permeable side or face with hydrophobic characteristics and 2) a catalytic side or face provided with a particulate electrocatalyst. The catalytic face is in direct contact with a liquid or solid electrolyte.

In order to form an electrode, the electrocatalyst material of the invention is carried on a conductive support. Suitable conductive supports are, for example, commercially available conductive carbons. The conductive support can be used as commercially prepared, or can be treated to increase its graphitic character. The preferred range of catalyst to support is generally about 1 to about 15 mg of Pt per $cm^2$ of support. Other materials with good electrical conductivity and high resistance toward acids may be used as a conductive support or added to a conductive support.

The hydrophobic characteristics on the electrode can be provided by any known suitable substance such as a fluorinated polymer, e.g., polytetrafluoroethylene (PTFE) or polytrifluorochloroethylene or a copolymer or tetrafluoroethylene and a second fluorinated monomer. A preferred range of the hydrophobic substance, which also serves as a binder for the Group VIII metal, support, and the oxide, is generally about 20 to about 40 wt % of the amount of conductive support.

The electrocatalyst material may be incorporated into an electrode by any known means. Preferred methods include spraying or painting of the liquid suspension of catalyst onto the support material, mixing a powdered catalyst and support, or any other method resulting in a uniform layer of the catalyst and support in the electrode.

For example, to form the electrode and, more specifically, the anode utilized in the example below, the powdered electrocatalysts were mixed with an appropriate amount of carbon (Vulcan™) previously mixed with a fluorinated polymer, such as polytetrafluoroethylene. Applicants used Teflon™ in an amount of 37% by weight of the electrode. The resulting mixture was then pressed onto a nickel net with electrochemically deposited gold overlayer. The final amount of Pt loading was 5 mg/$cm^2$. It is preferred that the fluorinated polymer be present in an amount of about 2 to about 15 grams per gram of catalyst.

Since only the surface of the catalyst is exposed to the solution and therefore involved in the oxidation of alcohol in the fuel cell, a thinner layer of catalyst is usually desired. The lower limit of thickness of the catalyst layer is determined by the hardness of the metallic mesh so that it does not break upon pressing the catalyst. A thicker layer of catalyst can be used as long as the electrode still has good electric conductivity. In general, the thickness of the catalyst on the conductive support is between about 0.2 and about 1 mm, preferably about 0.5 mm.

Electrodes typically are formed into various shapes such as a tube, rod, or a plane. It is preferred that the electrodes of the invention be formed into thin sheets to maximize the area-to-volume ratio.

The anodes containing the binary or ternary electrocatalysts described above can then be incorporated into a standard alcohol fuel cell. The fuel cell of the invention is a direct fuel cell, meaning that there is no need to use a catalytic reformer to generate pure hydrogen from the alcohol to feed the fuel cell.

Preferred alcohols are aliphatic alcohols, which may be straight-chain, branched-chain or cyclic, saturated or unsaturated. Preferred aliphatic alcohols are those having up to and including five (5) carbon atoms, for example, methanol, ethanol, propan-1-ol, propan-2-ol, butyl alcohols. Methanol is most preferred. The alcohol concentration in the fuel cell will typically be in the range of 0.5 to 2.0 mol/l.

It is also known to oxidize an alcohol at the anode when the alcohol is vaporized to a gaseous fluid and then fed to the fluid-permeable side of a gas-diffusion electrode. This vaporization can be carried out by heating the alcohol fuel directly or by passing an inert carrier gas (e.g., $N_2$) through it.

Electrochemical oxidation of alcohols, especially in fuel cells, is normally carried out in acidic aqueous media. The acid concentration in such media is typically in the range of 0.5–2.0 mol/l. The acid is preferably a strong acid such as sulfuric acid, phosphoric acid and perchloric acid. Hydrochloric acid is less preferred. Although the acidic medium may also contain a supporting electrolyte, such as a salt with or without a common anion with the acid, it is preferred that such supporting electrolyte not be present.

Solid polymer electrolytes can also be used in the alcohol fuel cell of the invention, and are sometimes preferred because of their excellent "cold start" capabilities and other advantages relating to ease of manufacture and avoidance of evaporation problems. Reliable acidic solid polymer electrolytes are commercially available, e.g., the sulfonated fluorinated olefin materials sold under the trademark NAFION by E. I. duPont deNemours and Co. of Wilmington, Del. Such membrane-like materials have a fluorinated olefin homopolymer or copolymer "backbone" and pendent partially or fully fluorinated hydrocarbon and/or ether chains or groups terminated with acidic groups, preferably —$SO_3H$, but phosphonic acid or boric acid type groups are also known.

The air or oxygen cathode of a fuel cell used in this invention can, if desired, be conventional in every respect. The electrocatalyst at the cathode can therefore be a supported Group VIII metal such as Pt, the support material being carbon or the like.

The fully assembled fuel cell can have stack designs to increase the electrical output. Any of the known stack configurations designed for compactness and efficient supply of fuels to the anode and oxidant gas to the cathode can be used. Any of the conventional means for providing a steady stream or flow of fuel to the anode or reducible gas (e.g., air or oxygen) to the cathode can be used. Electrode leads and external circuitry can also be conventional. Typically, an electric motor will be included in the external circuit.

EXAMPLE

Current potential curves were obtained using various electrocatalysts in a methanol oxidation fuel cell. Electrocatalysts of the invention (i.e., $NiWO_4$/Pt and $NiWO_4$/Pt/10% $RuO_2$) and known electrocatalysts (i.e., Pt—Ru (1:1 wt %) and Pt) were all tested for performance in an anode of a methanol fuel cell.

Measurements were performed using a solution of 0.5M $H_2SO_4$ and 0.5M $CH_3OH$ at room temperature (approximately 21° C.) in an all-glass electrochemical cell with three electrode arrangement. An equal amount of Pt (5 mg/$cm^2$) was used for the preparation of all catalysts. The approximate surface area of the catalyst was 1.42 $cm^2$. All of the catalysts were in the form of a powder and were supported by a 63% carbon (Vulcan™)/37% PTFE mixture. The reference electrode was connected to the solution through a Luggin capillary.

The current potential curves were obtained using quasi-stationary potentiodynamic regime, with the sweep rate of 1 mV/s. BAS 100 potentiostat was set to 100 mA current density. Reversible hydrogen electrodes served as a reference and 2 $cm^2$ Pt foil served as counter electrodes.

FIG. 1 is a graph demonstrating the results of the current potential obtained from the various electrocatalyst materials. The $NiWO_4$/Pt electrocatalyst generated more current than the Pt catalyst alone, but less than the fuel cell whose electrode contained the commercial electrocatalyst, i.e., Pt—Ru with a 1:1 atomic ratio (IFCC, Inc., Windsor, Conn.). The Pt—Ru electrocatalyst is considered to be the best electrocatalyst for methanol oxidation commercially available. The performance of a ternary electrocatalyst of the invention (NiWO$_4$/Pt/10% RuO$_2$) approaches that of Pt—Ru at potentials below 600 mV, and actually generates more current at higher potentials.

Without being bound by theory, the electrochemical performance of the fuel cells of the invention which utilize the novel electrocatalyst materials is improved over the prior art because the substrates used as the platinum support at the anode remove the carbon monoxide intermediates which poison the platinum, and reduce its ability to catalyze the oxidation of alcohol. The substrates remove the carbon monoxide intermediates by creating an OH species at the surface of the oxides in aqueous solutions, which oxidizes the carbon monoxide to form CO$_2$.

The concentration of OH species at the surface of the oxide-based electrocatalysts is replenished by the interaction of the substrate surface with water from the solution, so that no depletion of the OH species is observed. This is confirmed by in situ XANES (X-ray near-edge spectroscopy) measurements of Pt—Ru and Pt—RuO$_2$ catalysts. At high current densities, XANES measurements show a lack of Ru—OH species on the surface, which does not occur with Pt—RuOx electrocatalyst. This replenishing of the hydroxyl species by the oxide in aqueous solution allows for the rapid oxidation of the CO poison resulting in considerable current densities during alcohol electrooxidation.

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

What is claimed is:

1. An anode for use in the oxidation of alcohol in a fuel cell, said anode comprising an electrocatalyst comprising:
   i) a substrate selected from the group consisting of NiWO$_4$ or CoWO$_4$ or a combination thereof, and
   ii) Group VIII noble metal catalyst supported on said substrate.

2. An anode as described in claim 1 wherein said Group VIII noble metal catalyst is selected from the group consisting of platinum, palladium, ruthenium, iridium, rhodium, or a combination thereof.

3. An anode as described in claim 2 wherein said Group VIII noble metal is platinum.

4. An anode as described in claim 3 wherein the electrocatalyst material has a W:Pt atomic weight ratio from about 5:1 to about 1:1.

5. An alcohol fuel cell comprising an anode which comprises an electrocatalyst, said electrocatalyst comprising:
   i) a substrate selected from the group consisting of NiWO$_4$ or CoWO$_4$ or a combination thereof, and
   ii) Group VIII noble metal catalyst supported on said substrate.

6. An alcohol fuel cell as described in claim 5 wherein said Group VIII noble metal is selected from the group consisting of platinum, palladium, ruthenium, iridium, rhodium, or a combination thereof.

7. An alcohol fuel cell as described in claim 6 wherein said Group VIII noble metal is platinum.

8. An electrocatalyst comprising:
   i) a substrate selected from the group consisting of NiWO$_4$ or CoWO$_4$ or a combination thereof, and
   ii) a catalyst comprising
      Group VIII noble metal, and
      ruthenium oxide or molybdenum oxide or a combination thereof,
   said catalyst being supported on said substrate.

9. An electrocatalyst as described in claim 8 wherein said Group VIII noble metal is selected from the group consisting of platinum, palladium, ruthenium, iridium, rhodium, or a combination thereof.

10. An electrocatalyst as described in claim 9 wherein said Group VIII noble metal catalyst is platinum.

11. An anode for use in the oxidation of alcohol in a fuel cell, said anode comprising an electrocatalyst which comprises:
    i) a substrate selected from the group consisting of NiWO$_4$ or CoWO$_4$ or a combination thereof, and ii) a catalyst comprising
       Group VIII noble metal, and
       ruthenium oxide or molybdenum oxide or a combination thereof,
    said catalyst being supported on said substrate.

12. An anode as described in claim 11 wherein said Group VIII noble metal is selected from the group consisting of platinum, palladium, ruthenium, iridium, rhodium, or a combination thereof.

13. An anode as described in claim 12 wherein said Group VIII noble metal is platinum.

14. An alcohol fuel cell comprising an anode which comprises an electrocatalyst, said electrocatalyst comprising:
    i) a substrate selected from the group consisting of NiWO$_4$ or CoWO$_4$ or a combination thereof, and
    ii) a catalyst comprising
       Group VIII noble metal, and
       ruthenium oxide or molybdenum oxide or a combination thereof,
    said catatyst being supported on said substrate.

15. A fuel cell as described in claim 14 wherein said Group VIII noble metal is selected from the group consisting of platinum, palladium, ruthenium, iridium, rhodium, or a combination thereof.

16. A fuel cell as described in claim 15 wherein said Group VIII noble metal is platinum.

17. A method of oxidizing alcohol comprising contacting said alcohol with an anode comprising an electrocatalyst, said electrocatalyst comprising:
    i) a substrate selected from the group consisting of NiWO$_4$ or CoWO$_4$ or a combination thereof, and
    ii) Group VIII noble metal catalyst supported on said substrate.

18. A method as described in claim 17 wherein said Group VIII noble metal is selected from the group consisting of platinum, palladium, ruthenium, iridium, rhodium, or a combination thereof.

19. A method as described in claim 18 wherein said Group VIII noble metal is platinum.

20. A method of oxidizing alcohol comprising contacting said alcohol with an anode comprising an electrocatalyst, said electrocatalyst comprising:

i) a substrate selected from the group consisting NiWO$_4$ or CoWO$_4$ or a combination thereof, and ii) a catalyst comprising
   Group VIII noble metal, and
   ruthenium oxide or molybdenum oxide or a combination thereof,
said catatyst being supported on said substrate.

21. A method as described in claim 20 wherein said Group VIII noble metal is selected from the group consisting of platinum, palladium, ruthenium, iridium, rhodium, or a combination thereof.

22. A method as described in claim 21 wherein said Group VIII noble metal is platinum.

* * * * *